United States Patent [19]
McHale

[11] 4,292,344
[45] Sep. 29, 1981

[54] FLUIDIZED BED HEATING PROCESS AND APPARATUS

[75] Inventor: Edward J. McHale, North Tonawanda, N.Y.

[73] Assignee: Union Carbide Corporation, New York, N.Y.

[21] Appl. No.: 14,645

[22] Filed: Feb. 23, 1979

[51] Int. Cl.³ .......................... C01B 33/00; H05B 6/54
[52] U.S. Cl. .................................. 427/45.1; 427/213;
427/86; 118/716; 219/10.41; 219/10.81;
219/10.65; 423/349; 422/146; 422/240
[58] Field of Search .............. 219/10.65, 10.81, 10.51,
219/10.49 R, 10.41, 10.43, 10.75, 10.57;
156/600, 602, 613; 23/295 R, 301, 313 FB, 232
E; 427/213, 86, 45.1; 422/139–147, 240;
423/348–350; 428/391; 118/716, 723; 34/57 A,
57 R

[56] References Cited

U.S. PATENT DOCUMENTS

| | | | |
|---|---|---|---|
| 2,404,474 | 7/1946 | Collins | 219/10.65 X |
| 2,489,135 | 11/1949 | Himmel et al. | 219/10.65 |
| 2,494,716 | 1/1950 | McMahon et al. | 219/10.65 |
| 2,602,134 | 7/1952 | Nelson | 219/10.55 |
| 3,006,734 | 10/1961 | Cowlard et al. | 23/223.5 |
| 3,012,861 | 12/1961 | Ling | 427/86 |
| 3,012,862 | 12/1961 | Bertrand et al. | 23/223.5 |
| 3,014,791 | 12/1961 | Benzing et al. | 23/273 |
| 3,041,144 | 6/1962 | Schering | 23/223.5 |
| 3,053,638 | 9/1962 | Reiser | 23/223.5 |
| 3,171,009 | 2/1965 | Scheller et al. | 219/10.55 |
| 3,305,661 | 2/1967 | Shine et al. | 219/10.65 |
| 3,359,707 | 12/1967 | Jean | 55/33 |
| 3,404,078 | 10/1968 | Goldberger | 204/164 |
| 3,577,207 | 5/1971 | Kirjushin | 219/10.65 X |
| 3,654,126 | 4/1972 | McNabney et al. | 204/314 |
| 3,734,846 | 5/1973 | McNabney et al. | 204/176 |
| 3,963,838 | 6/1976 | Setty et al. | 423/349 X |
| 3,970,567 | 7/1976 | Lowther | 250/533 |
| 4,038,050 | 7/1977 | Lowther | 55/18 |
| 4,092,446 | 5/1978 | Padovani et al. | 427/213 |

FOREIGN PATENT DOCUMENTS

| | | | |
|---|---|---|---|
| 839688 | 5/1952 | Fed. Rep. of Germany | 219/10.65 |
| 581362 | 12/1977 | U.S.S.R. | 219/10.81 |

OTHER PUBLICATIONS

"Low Cost Silicon Solar Array Project", Quarterly Progress Report by Union Carbide Corp., Oct.–Dec. 1977, Publication Date: 3-2-78.

Primary Examiner—Gene Z. Rubinson
Assistant Examiner—Philip H. Leung
Attorney, Agent, or Firm—Frederick J. McCarthy, Jr.

[57] ABSTRACT

Capacitive electrical heating of a fluidized bed enables the individual solid particles within the bed to constitute the hottest portion thereof. This effect is achieved by applying an A. C. voltage potential between dielectric coated electrodes, one of which is advantageously the wall of the fluidized bed rejection zone, sufficient to create electrical currents in said particles so as to dissipate heat therein. In the decomposition of silane or halosilanes in a fluidized bed reaction zone, such heating enhances the desired deposition of silicon product on the surface of the seed particles within the fluidized bed and minimizes undesired coating of silicon on the wall of the reaction zone and the homogeneous formation of fine silicon powder within said zone.

44 Claims, 2 Drawing Figures

FLUIDIZED BED HEATING PROCESS AND APPARATUS

STATEMENT

The invention described herein was made in the performance of work under NASA Contract Number NAS 7-100, JPL No. 954334, for high purity silicon and is subject to the provisions of Section 305 of the National Aeronautics and Space Act of 1958 (72 Stat. 435; 42 U.S.C. 2457).

BACKGROUND OF THE INVENTION

1. Field of the Invention

The invention relates to the heating of fluidized beds. More particularly, it relates to an improved process for the heating of such beds and for enhancing the fluidized bed conversion of silane to polycrystalline silicon.

2. Description of the Prior Art

A variety of means are well known in the art for applying necessary heat to fluidized bed reaction zones. A suitable heat transfer fluid and inductive or electrical resistance heaters are examples of such means. While adequate for the purposes of many applications, such means are not entirely satisfactory for other fluidized bed applications because of the particular nature of the desired reactions occurring therein and of undesirable side effects that accompany such reactions using fluidized beds heated by conventional means.

The production of polycrystalline silicon from silane or a halo-silane in a fluidized bed reaction zone is a significant example of the limitations of conventional means for heating such fluidized beds. In this example, silicon seed particles are suspended in a fluidizing gas stream into which, for example, silane is injected. Process conditions are desirably maintained so that the decomposition of the silane occurs in the heterogeneous region or manner, i.e., the silane decomposes on the surface of the seed particles in the fluidized bed. In this manner, the seed particles grow by the deposit of silicon thereon so that sufficiently large particles of silicon product are grown to permit convenient removal thereof from the reaction zone, while by-product hydrogen can be separately removed as overhead from said reaction zone. When chlorosilanes are decomposed, the by-product gas will comprise HCl which is more difficult to handle than the hydrogen by-product of silane decomposition.

Conventional means of heating a fluidized bed reaction zone will result, however, in an undesired coating of silicon on the wall of the reaction zone, possibly in preference to the desired fluidized seed particle growth. Silane decomposition in fluidized beds employing conventional heating means likewise results in the homogeneous decomposition of silane to form fine silicon powder or dust. This large surface area, light, fluffy powder is undesirable in fluidized bed operations as it comprises waste material or requires careful and costly additional handling for recovery and consolidation or melting without unacceptable contamination due to environmental effects.

The development of an improved process for heating fluidized bed reaction zones is, therefore, desirable and of great significance to the development of low-cost silicon technology. In the production of high purity polycrystalline silicon, current commercial technology constitutes a low volume, batch operation generally referred to as the Siemens process. This technology is carried out in the controlled atmosphere of a quartz bell jar reactor that contains silicon rods electrically heated to about 1100° C. Trichlorosilane, in concentrations of less than 10% in hydrogen, is fed to the reactor under conditions of gas flow rate, composition, silicon rod temperature and bell jar temperature adjusted so as to promote the heterogeneous decomposition of the chlorosilane on the substrate rod surfaces. A general description of the Siemens-type process can be found in the Dietz, et al. patent, U.S. Pat. No. 3,979,490.

Because of the inherent limitations of such batch processing and because of the relatively high processing costs associated with the commonly employed process for reacting metallurgical grade silicon with HCl to form trichlorosilane, polycrystalline semiconductor grade silicon made from metallurgical grade silicon costing about $0.50/lb. will cost on the order of about $30/lb. and up. In growing a single crystal of this semiconductor grade material, the ends of the single crystal ingot are cut off, and the ingot is sawed, etched and polished to produce polished wafers, as for solar cell application, with mechanical breakage and electronic imperfection reducing the amount of usable material obtained. As a result, less than 20% of the original polycrystalline, semiconductor grade silicon will commonly be recoverable in the form of useful wafers of single crystal material. The overall cost of such usable material is, accordingly, presently on the order of about $300/lb. and up. Because of the relatively large area requirements involved in solar cell applications, such material costs are a significant factor in the overall economics of such applications. It will be understood that such material costs are also of significant concern in applications of such high purity, single crystal silicon for various semiconductor applications apart from use in solar cell structures.

The economic feasibility of utilizing silicon for solar cell and for semiconductor applications would be enhanced, therefore, if the overall cost of producing high purity, single crystal silicon in desired form could be reduced. One important area of interest in this regard is in the production of polycrystalline silicon from silane, chlorosilanes or other halo-silanes in a fluidized bed reaction zone as discussed above. The decomposition of such silanes in a fluidized bed reaction zone is disclosed in Ling, U.S. Pat. No. 3,012,861 and Bertrand, et al., U.S. Pat. No. 3,012,862. In this approach, a silicon-containing gas is injected into a reaction chamber containing particles of elemental silicon small enough to be fluidized and maintained in ebullient motion to expose their entire surfaces for nucleating contact with the silicon-containing gas. The reaction chamber and the fluidized bed of silicon particles are maintained at a temperature within the thermal decomposition range of the gas and below the melting point of silicon. In the Ling patent, the use of external heating means 11, such as electric resistance heaters, surrounding the vertical walls of reactor 1 is disclosed. Bertrand, et al. disclose electrical or other type of external heating means 2, with electrical resistance heating elements said to be preferred in small scale operations and other heating means, such as indirect gas firing can be used in large scale operations. The preheating of hydrogen and/or other reactants prior to introduction into the reactor so that little or no additional heat need be supplied through the wall of the reaction zone is also taught by Bertrand, et al.

The silicon-containing compound injected into the reaction chamber, particularly silane, will be subject to homogeneous decomposition upon exposure to the reaction conditions within the chamber as well as the desired heterogeneous decomposition and deposition of product silicon on the seed particles present in the fluidized bed. As a result of such homogeneous decomposition, considerable quantities of silicon dust are formed. This dust is undesired in the fluidized bed process, as noted above, as it results in a considerable loss of material and/or additional processing expense. Such undesired dust formation is a factor that has heretofore deterred the development of the fluidized bed approach as a practical alternative to the conventional Siemens process. The need continues, therefore, for the development of technically and economically feasible alternatives to the Siemens process for the production of high purity silicon for semiconductor and solar cell applications.

It is another object of the invention to provide an improved process for the heating of fluidized beds.

It is another object of the invention to provide a process enhancing the heterogeneous decomposition of the feed gas passed to a heated fluidized bed reaction zone.

It is another object of the invention, therefore, to provide an improved process and apparatus for the production of low-cost, high purity polycrystalline silicon.

It is another object of the invention to provide a process and apparatus for the enhanced production of high purity silicon on a continuous or semicontinuous basis.

It is another object of the invention to provide an improved process for the production of silicon capable of advantageously employing silane as the silicon-containing feed material.

It is a further object of the invention to provide an improved process and apparatus for the fluidized bed decomposition of silane and halo-silanes with minimal formation of undesired silicon dust.

It is a further object of the invention to provide an improved process and apparatus for the production, at relatively high production rates, of high purity polycrystalline silicon suitable for semiconductor and solar cell applications.

With these and other objects in mind, the invention is hereinafter described in detail, the novel features thereof being particularly pointed out in the appended claims.

SUMMARY OF THE INVENTION

The process and apparatus of the invention achieve the heating of a fluidized bed reaction zone by the application of heat within the individual particles of the fluidized bed. For this purpose, an A.C. voltage potential is applied between dielectric coated electrodes positioned in contact with said fluidized bed. The voltage is sufficient to create electrical currents within the individual solid particles of the fluidized bed, said currents resulting in the dissipating of heat within the particles. The resulting heat flow passes from the individual particles to the surrounding gas and then through the wall of the reaction zone or out of said zone with the reactant gas flow therefrom. The individual particles are thus the hottest portion of the fluidized bed reaction zone. In particular embodiments, the wall of the reaction zone is coated with the dielectric coating, such as high purity quartz, and serve as one of said electrodes. The invention is highly advantageous in the fluidized bed conversion of silanes to polycrystalline silicon since the capacitive electrical heating of the fluidized bed enhances the heterogeneous decomposition of the silane and deposit of silicon on the seed particles and minimizes the coating of silicon on the wall of the reaction zone and the undesired homogeneous decomposition of the silane and formation of undesired silicon dust.

BRIEF DESCRIPTION OF THE DRAWINGS

The invention is hereinafter further described with reference to the accompanying drawings in which.

DETAILED DESCRIPTION OF THE INVENTION

The present invention represents a significant advance in the art by enabling the individual particles of a fluidized bed to be heated directly by capacitive electrical heating so that said particles constitute the hottest portion of the fluidized bed. The practice of the invention is particularly advantageous in the production of silicon from silanes as it enhances the desired heterogeneous decomposition of the silanes and deposit of silicon on the seed particles within the fluidized bed.

The objects of the invention are accomplished by applying an AC voltage potential between spaced-apart dielectric coated electrodes positioned in contact with the fluidized bed. The voltage potential and the frequency employed are such that electrical currents are created within the individual solid particles in the bed. Such currents dissipate heat predominantly within the particles rather than in the gaps between the particles. The currents are driven through the capacitance between said particles and the electrodes, one of which is the dielectric coated wall of the reaction chamber within which the fluidized bed is maintained. For applications such as the decomposition of silane, the capacitive electrical heating of the fluidized bed in accordance with the invention establishes highly favorable temperature profiles within the bed compared with those pertaining to previously known techniques for adding heat to the fluidized bed, as through the walls of the reaction chamber.

Figure 1:
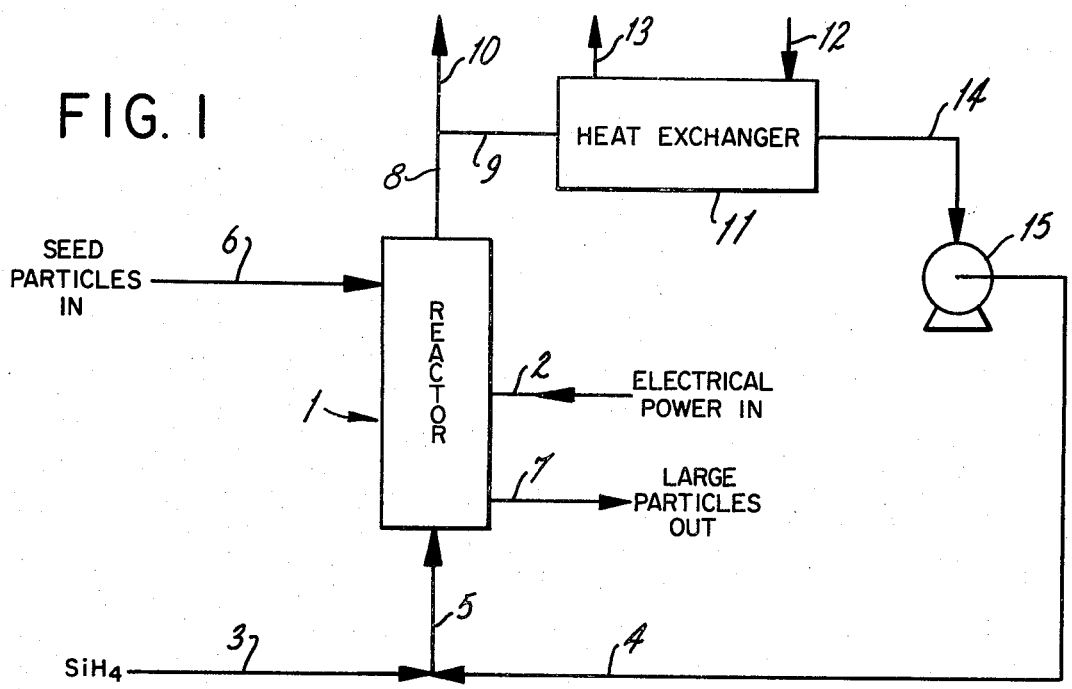
FIG. 1 illustrates an embodiment of a silane decomposition process utilizing the capacitive electrical heating of the invention for supplying heat to the individual particles of a fluid bed reaction zone.

Referring to the drawings, FIG. 1 illustrates the overall silane decomposition process in which the capacitive electrical heating of the fluidized bed can be advantageously employed. The fluidized bed reaction zone 1 is heated by said electrical heating means generally represented by the numeral 2. The silane, SiH$_4$, feedstock material in line 3 is combined with recycle hydrogen in line 4, and the thus-diluted silane gas stream is introduced through line 5 into the bottom portion of said fluidized bed reaction zone 1. Silicon seed particles of conventional size are introduced into reaction zone 1 through line 6. Said seed particles are suspended as a fluidized bed (not shown) within reaction zone 1 and agitated by the gas stream entering the reaction zone from line 5. Relatively large silicon particles, comprising silicon product deposited on the silicon feed particles upon heterogeneous decomposition of silane within the fluidized bed, are removed from the bottom of reaction zone 1 through line 7. Such particles will conveniently be of a size and density suitable for direct handling without the further consolidation otherwise necessary in processes producing a fine silicon powder or dust in appreciable amounts.

As noted above, the use of silane as the silicon-containing gas is advantageous in that silane and its decomposition products, i.e., silicon and hydrogen, are non-corrosive and nonpolluting. The by-product hydrogen generated upon decomposition of silane is removed from reaction zone 1 through line 8 together with said fluidizing hydrogen introduced into the reaction zone through line 5. A portion of said hydrogen is recycled through line 9, while the remainder of the hydrogen is removed through line 10 for other use, not shown, as for the dilution of the silicon-containing gas fed to reaction zone 1 or for the hydrogenation of silicon tetrachloride and metallurgical grade silicon in the preparation of trichlorosilane an the silane employed as the feed material to the reaction zone in the illustrated embodiment.

Recycle hydrogen stream 9 passes to heat exchanger 11 for cooling therein in countercurrent flow with a coolant that enters exchanger 11 through line 12 and exits therefrom through line 13. The cooled hydrogen recycle stream leaves exchanger 11 through line 14 and is pumped by means of pump 15 to line 4 for mixing with the silane feed material and passage into reaction zone 1 through line 5. The silane feedstock, diluted with hydrogen or with an inert gas to the extent desired in accordance with conventional practice, is generally maintained at a temperature below its decomposition temperature range to avoid premature decomposition and to enhance the desired heterogeneous decomposition within the fluidized bed reaction zone.

Figure 2:
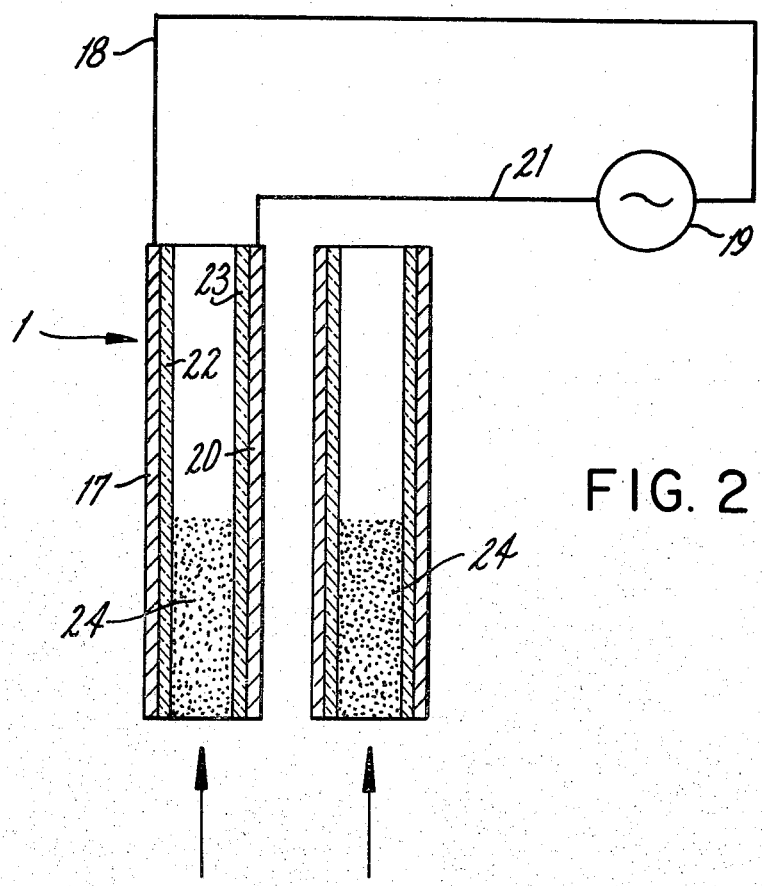
FIG. 2 illustrates a fluidized bed reaction chamber suitable for use in the practice of the process of FIG. 1 and adapted for the capacitive electrical heating of the particles within the fluidized bed.

The capacitive electrical heating of the invention is illustrated in FIG. 2. In this embodiment, fluidized bed reaction zone 1 is shown as a cylindrical reaction chamber fitted with an internal, centrally placed electrode all connected to a suitable electrical power supply. The wall of the reaction chamber and the electrode are coated with a dielectric material, and the space inside the reactor contains the fluidized bed comprising a mixture of suspended silicon particles and the hydrogen and silane gas mixture. More specifically, reaction zone 1 includes cylindrical wall 17 connected by electrical connection lead 18 to A.C. power supply 19. The internal, centrally located electrode 20 is connected by lead 21 to said power supply 19. The inner side of said wall 17 is coated by a suitable dielectric coating 22, and the outer surface of internal electrode 20 is likewise coated by a suitable dielectric coating 23. Fluidized bed 24 comprises agitated silicon particles suspended in a gas mixture including the silane feedstock, by-product hydrogen and additional recycle hydrogen or an inert gas employed as a carrier gas and diluent for the silane feed gas.

During operation of the process and apparatus of the invention, electrical power supply 19 applies an alternating voltage potential across dielectrode coated electrodes 17 and 20 at a frequency such that electrical currents are created within the individual solid particles of the fluidized bed. Such currents dissipate heat predominantly within said particles and create favorable temperature profiles within reaction zone 1 so as to reduce or avoid the coating of the inside surface of said delectric coating 22 on wall 17 of reaction zone 1 with silicon and likewise to minimize the homogeneous decomposition of silane within reaction zone 1 with consequent formation of undesired silicon powder or dust.

By means of the capacitive electrical heating of the invention, the individual solid particles within the fluidized bed constitute the hottest portion of the fluidized bed. The resulting heat flow is thus from the heated particles to the surrounding gas and then out of reaction zone 1 through wall 17 or with the reactant gas flow out of said zone 1 as overhead material. The heterogeneous decomposition of silane and the resultant deposit of product silicon on the surface of the seed silicon particles is thus favored and enhanced within the constraints otherwise imposed by the operating conditions pertaining to any particular application. In this latter regard, it will be appreciated by those skilled in the art that various processing parameters associated with any given fluidized bed operation will have a significance with respect to the desired results of that operation apart from the manner of fluidized bed heating as herein disclosed and claimed. In silane decomposition, for example, the decomposition has been found to be either homogeneous or heterogeneous depending on the concentration of the silane fed to the fluidized bed reaction zone at any given temperature of the solid particles within or in contact with the fluidized bed reaction zone. At concentrations above a critical amount at any given temperature, the silane decomposition reaction may proceed primarily as a homogeneous reaction, e.g., above about $10^{-2}$ mole fraction at 1000° K., whereas at lower concentrations the decomposition reaction is heterogeneous. In the fluidized bed decomposition of silane or halo-silanes, it is important that the reaction proceed in the heterogeneous reaction region, so as to avoid the formation of submicron, large surface area, fluffy silicon powder or dust. While the heterogeneous reaction results in the growth of relatively large particles by the deposit or plating of product silicon on silicon seed particles, the present invention represents an important improvement in the heterogeneous decomposition process by enhancing such desired deposition and growth of silicon particles that can conveniently be handled and used in further processing operations and minimizing undesired silicon deposit on the wall of the reaction chamber and undesired formation of silicon dust. It will be appreciated by those skilled in the art that the capacitive electrical heating process and operation of the present invention can be employed in a variety of other known fluidized bed reactions, being particularly desirable for such reactions in which it may be advantageous to heat the fluidized particles to a higher temperature than the surrounding environment within the reaction zone.

It is within the scope of the invention to position dielectric coated electrodes in any convenient, spaced-apart position within the fluidized bed reaction zone. In addition to the illustrated embodiment, therefore, two or more dielectric coated electrodes may be positioned internally within said reaction zone, and it is possible to arrange such electrodes in a variety of convenient configurations within the bed. For example, a grid arrangement of dielectric coated rods or tubes may be employed to form the spaced apart electrodes needed for the addition of electrical energy to the fluidized bed.

The A.C. voltage potential applied between the spaced-apart dielectric coated electrodes is sufficient to create electrical currents through the individual solid particles within the fluidized bed at the imposed electrical frequency. The voltage potential and the frequency of the A.C. electrical energy source will be understood to depend, in any given application, on the combination of the dielectric coating of the electrodes and the electrical characteristics of the fluidized bed employed in that application. Likewise, the material and thickness of the dielectric coating will be understood to be a function of the particular design applied and to be related to the particular electrical energy source employed. While the invention has been described above with reference to preferred embodiments in which a dielectric coating is employed on both spaced-apart electrodes, it is also within the scope of the invention to employ such a coating on only one of the electrodes. When the reaction chamber wall is to be used as an electrode, it is desirable, in the silicon production application, that said wall be coated with the dielectric coating for the reason indicated below. In preferred embodiments, both the reactor wall and the electrode positioned within the fluidized bed will be coated with a suitable dielectric coating. The various operating and apparatus parameters are not limited to any particular values, however, and the design values associated with a given application can be approximated by considering the system as the equivalent of an electrical circuit of one or more capacitors, i.e., dielectric coated electrodes, and a series connected equivalent resistance of the fluidized bed between such capacitors. Such analysis of the electrical circuit is consistent with standard electrical engineering technology.

Any dielectric coating material, e.g., aluminum oxide or quartz, available in the art and suitable for use under the operating conditions of a given application may be employed to coat the spaced-apart conductive electrodes of the invention. As will be appreciated by those skilled in the art, the term "dielectric," as used herein, means an electrical insulation, or nonconductive, material regardless of its electrical permitivity. The coating of the wall of the reaction chamber with a high purity quartz coating has the additional benefit, in the fluidized bed production of high purity polycrystalline silicon, of minimizing contamination of the silicon product. It will be readily understood by those skilled in the art that high purity quartz for such application will comprise an available grade of requisite purity such that the coating of such quarts does not impart undesired impurities to the silicon being formed in the fluidized bed reaction zone. The capacitive coupling of the electrical energy source to the particles in the fluidized bed by use of the dielectric coated electrode surfaces serve not only to impose uniform potential gradients throughout the bed, but to maintain the high purity conditions required for the productin of ultrapure silicon product.

The size of the seed particles comprising the fluidized bed are not critical to the invention per se and may be maintained within the normal limits commonly employed in the various fluidized bed applications known in the art. In the Ling Patent, U.S. Pat. No. 3,012,861, the use of elemental silicon particles sized to $-20 +25$ mesh was disclosed. In the Bertrand, et al. patent, U.S. Pat. No. 3,012,862, high-purity silicon was said to be sized to, for example, $-40 +100$ mesh, or $-60 +100$ mesh. The pure silicon formed during the silane decomposition reaction causes the particles to grow or increase in size to the point where they no longer effectively fluidize at the prevailing gas velocities. The nonfluidizable silicon particles, upon reaching such size limit, can be continuously removed from the reaction chamber. While the fluidized bed processing conditions for the practice of the invention are not limited relative to particle or gas characteristics, it is generally preferred that the fluidization conditions employed be such that the suspended bed particles are only slightly above the minimum fluidization condition for any given application. The resulting relatively high particle density of the fluidized bed improves the effectiveness of the addition of electrical energy to the reaction zone by the means of the present invention. Additionally, such condition minimizes any diffusion or homogeneous reaction effects within the gas phase in that large gas voids or bubbles are minimized. Since the heat transfer into the fluidized bed is directly through the particles themselves, it is not necessary for the bed to be violently agitated in order to transfer heat uniformly through the bed. In addition, the relatively moderate solid particle agitation possible and preferred in embodiments of the invention are advantageous in that the newly deposited silicon on the particle surface is not subjected to severe mechanical forces that might serve to erode the particle.

In the advantageous use of the present invention in the fluidized bed production of silicon, any suitable silicon-containing gas stream capable of being thermally pyrolyzed or reduced in the gas phase may be used as the feed gas to the fluidized bed. Illustrative of the gases that may be employed are silane and the halosilanes of chlorine, bromine and iodine. While the chlorosilanes, such as trichlorosilane, tetrachlorosilane and dichlorosilane, may thus be employed, particular advantages are realized through the use of silane, i.e., $SiH_4$, as the source of high purity silicon. The exothermic silane pyrolysis reaction goes to completion, is irreversible and starts at a somewhat lower temperature, i.e., about 390° C., than the chlorosilanes. In addition as noted above, silane and its decomposition products, i.e., silicon and hydrogen, are noncorrosive and nonpolluting. The by-product hydrogen generated upon decomposition of silane may be used as a carrier gas, recirculated as a preheater gas, bottled or sold, recycled for use in the overall process for producing high purity silicon from metallurigical grade silicon. The chlorosilane decomposition, on the other hand, is a reversible and incomplete reaction and both the chlorosilanes and their decomposition by-products are corrosive in nature. The overall advantages of utilizing silane are accompanied by some disadvantages as will be appreciated by those skilled in the art, however, namely in the spontaneous combustion of silane with air and in the higher current price of silane compared to that of the chlorosilanes.

The silicon-containing gas can be introduced into the fluidized bed reaction zone, generally from the bottom thereof in accordance with conventional practice, as essentially 100% silicon-containing gas without dilution or said gas may be diluted with inert carrier or fluidizing gases, such as argon, helium or the like, or with hydrogen, or with other silicon-containing gases. For optimum product and production control, it may be desirable to dilute the silane or other silicon-containing gas with a suitable carrier gas prior to injection into the fluidized bed. In the decomposition of silane, by-product hydrogen, as previously noted, can be recycled for use as a carrier gas for additional quantities of silane feed gas in the semicontinuous or continuous operations desirably carried out in a fluidized bed heated by the capacitive electrical heating of the invention.

The silicon-containing gas is introduced into the fluidized bed reaction zone maintained at a temperature within the decomposition temperature range of the particular silicon-containing gas employed and below the melting point temperature of silicon, i.e., about 1420° C. For efficient heterogeneous decomposition of the feed gas, with resultant deposit of high purity silicon preferentially in the hot solid feed particles heated by capacitive heating, it is desirable to employ a temperature within the range of from about 390° C. to about 1400° C. Preferable temperatures are in the range of from about 550° C. to about 1000° C.

Those skilled in the art will appreciate that the particular processing and equipment limitations employed in any given application will depend upon the overall system and desired operation conditions for that application. For the silane pyrolysis application, the preferred dielectric coating is high purity quartz that reduces the potential for impurity contamination of the silicon product. In experimental runs demonstrating the feasibility of imparting heat to the fluidized bed by means of the invention, it was indicated that suitable coating thicknesses will range from about 0.05 to about 10 mils, with from about 0.1 to about 1.0 mils being generally preferred. The electrical power source must be alternating current with the frequency ranging from as low as about 1 kilo Hz up to about 5 mega Hz., with the preferred frequency range appearing to be from about 10 to about 500 kilo Hz under the conditions employed. The applied voltage potential for the silane decomposition application is generally believed to be between about 10 to about 1000 volts in experimental runs under conditions as described above and employing 2 to 6 inch diameter reactors. The voltage level employed will generally increase with the reactor diameter size.

It should be noted that the capacitively coupled heating of the invention and conduction heating can occur in the same reactor configuration. A voltage applied directly across the fluidized bed causes a current to flow through the particles in the bed. At particle contact points, a concentration of current occurs, dissipating relatively large amounts of heat. A principal difference in heaing effect between conduction and capacitive heating resides in the electrical frequency used. At low frequencies, or with the use of a D.C. potential, conduction heating occurs due to arcing in the contact zone. At higher frequencies, such as those disclosed above, capacitive effects pertain, reducing or minimizing the arcing that occurs in conductive heating and achieving heat dissipation predominantly within the particles themselves rather than in the gaps existing therebetween. In this manner, the resulting heat flow passes from the individual particles to the surrounding gas within the fluidized bed, with the individual particles thus constituting the hottest portion of the fluidized bed reaction zone.

The exact nature of the particle contact region is less important in a fluidized bed heated by capacitive heating than in a fluidized bed heated by conventional means. The fact that contact between the particles and the conducting electrodes is not necessary represents a further significant advantage of capacitive heating. This circumstance enables the wall of the reaction chamber being used as an electrode to nevertheless be coated with a dielectric coating of high purity quartz or other suitable, inert insulating material as will be employed preferably in practical commercial applications of the invention. The process and apparatus of the invention can be employed also in embodiments in which it is desired to blow a gas through porous reaction chamber wall to avoid particle-wall contact.

The ability of the capacitive heating technique to furnish heat effectively to a fluidized bed was demonstrated in tests employing a steel reaction column containing 350 cc of $-35$ $+60$ mesh, U.S. Sieve Series, silicon particles having a height of 6.2" fluidized at a minimum fluidization pressure of 9.2" $H_2O$. For convenience in the test run, the wall of the reaction chamber was not coated with a dielectric coating although the coating of the wall would be preferred in practical commercial operations as indicated above. The spaced-apart electrode positioned within the fluidized bed in the column was flame sprayed with a alumina dielectric coating having an average thickness of 2.5 mil, but of somewhat irregular depth. An A.C. voltage of 44 volts was applied between the spaced apart electrodes at a frequency of 75 kilo Hz. Nitrogen gas fed to the fluidized bed reaction zone was at an inlet temperature of 487° C. The chamber wall reached a temperature of 773° C. The temperature of the solid particles in the bed was 785° C., so that heat dissipation was predominately from within the particles themselves, creating the highly desirable temperature profile in which the particles themselves constitute the hottest portion of the fluidized bed.

The use of silicon for electronic applications requires the production of ultra-high purity silicon material. For use in semiconductors, it is common to require silicon material with impurity levels of less than 1 ppb, i.e., less than one part per billion. Continuing advances in the electronics industry and the development of many new products in this field have led to an expanding market for ultra-high purity silicon. High purity silicon is also required for the fabrication of solar cell arrays, as discussed above, for the direct conversion of sunlight to electricity. For all such applications, improvements in existing silicon technology are urgently needed to achieve enhanced silicon purity and quality while, at the same time, reducing the cost of such silicon to enhance the overall technical-economic feasibility of its use in practical commericial applications. The production of high purity polycrystalline silicon on a continuous or semicontinuous basis, by use of a fluidized bed reaction zone, is an important aspect of the overall processing to produce ultra-high purity, single crystal silicon from metallurgical grade silicon. The present invention serves to enhance the heterogeneous decomposition of the silicon-containing gas on the silicon seed particles in the bed, minimizing undesired homogeneous decomposition and formation of silicon powder or dust and undesired silicon deposition on the wall of the reaction zone. By enabling heat dissipation predominantly from the particles themselves so that the particles themselves are the hottest portion of the fluidized bed reaction zone, the invention achieves the highly desirable benefits in an economically attractive manner so as to both overcome the disadvantages and to enhance the advantages inherent in conventional fluidized bed silicon production operations. The invention more broadly enhances fluidized bed operations by promoting desired heterogeneous reactant decomposition on the surface of the seed particles in the fluidized bed. The invention thus represents a highly significant improvement in fluidized bed processing and in the development of low-cost silicon materials for use in solar cell applications and in satisfying the requirements for high purity silicon for semiconductor applications.

What is claimed is:

1. An improved process for the heating of particles suspended in a surrounding gas flow in a fluidized bed reaction zone comprising applying an A.C. voltage potential between spaced-apart electrodes positioned in contact with said fluidized bed, at least one of said electrodes having a dielectric coating thereon, said voltage potential and the electrical frequency being sufficient to create electrical currents through the individual solid particles such that heat is dissipated predominantly within the individual particles, whereby the resulting heat flow passes from the individual particles to the surrounding gas within the fluidized bed and then exits through the walls of the reaction zone or with the gas flow from said zone, the individual particles thus constituting the hottest portion of said fluidized bed reaction zone.

2. The process of claim 1 in which said voltage potential is applied between one said electrode positioned in the interior of the fluidized bed and the wall of the reaction zone, said wall serving as a separate said electrode.

3. The process of claim 1 in which both of said electrodes comprise dielectric coated electrodes.

4. The process of claim 1 in which said voltage potential is applied across two electrodes both of which are positioned within said fluidized bed.

5. The process of claim 1 in which said voltage is applied across a grid of said electrodes.

6. The process of claim 1 in which said particles are suspended at slightly above minimum fluidization conditions.

7. The process of claim 1 in which said voltage potential is applied between the walls of a dielectric coated cylindrical reaction zone comprising one electrode and an internal, centrally located electrode.

8. The process of claim 7 in which said internal electrode comprises a dielectric coated electrode.

9. The process of claim 3 in which said coating comprises high purity quartz.

10. An improved process for the production of high purity, polycrystalline silicon in a fluidized bed reaction zone comprising:
 (a) introducing a silicon-containing gas capable of gas phase decomposition into a fluidized bed of silicon seed particles in a reaction zone maintained within the decomposition temperature range of said gas and below the melting point temperature of silicon, said decomposition temperature being maintained by applying an A.C. voltage potental between spaced-apart electrodes positioned in contact with said fluidized bed, at least one of said electrodes having a dielectric coating thereon, said voltage potential and the electrical frequency being sufficient to create electrical currents through the individual solid particles in said fluidized bed, with the heat dissipated within said individual particles being the predominant heat dissipated in said fluidized bed;
 (b) removing unreacted fluidizing vapor and reaction by-product gases from said fluidized bed reaction zone; and
 (c) withdrawing said particles having silicon product deposited thereon from said reaction zone, whereby silicon is recoverable as low-cost, high purity polycrystalline product capable of being produced at relatively high production rates on a semicontinuous or continuous basis, the heat flow within said reaction zone passing from the individual particles to the surrounding gas within the fluidized bed and then exiting through the wall of the reaction zone or with said fluidizing vapor and by-product gases, the individual silicon particles thus being the hottest portion of the reaction zone, thereby enhancing the heterogeneous depositing of silicon on the seed particles and minimizing undesired coating of silicon on the wall of the reaction zone and the homogeneous formation of fine silicon powder within said reaction zone.

11. The process of claim 10 in which said decomposition temperature is from about 390° C. to about 1400° C.

12. The process of claim 11 in which said decomposition temperature is from about 550° C. to about 1000° C.

13. The process of claim 10 in which said silicon-containing gas is taken from the group consisting of silane and halo-silanes.

14. The process of claim 13 in which said gas comprises silane, said by-product gas being hydrogen.

15. The process of claim 13 in which said gas comprises trichlorosilane.

16. The process of claim 13 in which said gas comprises dichlorosilane.

17. The process of claim 13 in which said gas comprises tetrachlorosilane.

18. The process of claim 14 in which said silane is diluted with hydrogen or an inert carrier gas prior to being introduced to said reaction zone.

19. The process of claim 18 in which said carrier gas comprises hydrogen.

20. The process of claim 19 and including recycling by-product hydrogen as said carrier gas.

21. The process of claim 10 in which said voltage potential is applied between one said electrode positioned in the interior of the fluidized bed and the wall of the reaction zone, the interior side of said wall being coated with a dielectric coating, said dielectric coated wall serving as one said electrode.

22. The process of claim 21 in which said dielectric coating comprises high purity quartz, said quartz minimizing environmental contamination of the silicon product.

23. The process of claim 21 in which said gas comprises silane, said by-product gas being hydrogen.

24. The process of claim 10 in which said voltage potential is applied across two electrodes both of which are positioned within said fluidized bed.

25. The process of claim 10 in which said voltage is applied across a grid of said electrodes.

26. The process of claim 21 in which said electrode positioned in the interior of the fluidized bed comprises a dielectric coated electrode.

27. The process of claim 10 in which said particles are suspended at slightly above minimum fluidization conditions, the resulting relatively high particle density in the fluidized bed enhancing the capacitive electrical heating of the fluidized bed.

28. The process of claim 26 in which said dielectric coating comprises high purity quartz.

29. The process of claim 28 in which said coating has a thickness of from about 0.05 to about 10 mils.

30. The process of claim 29 in which said coating thickness is from about 0.1 to about 1.0 mils.

31. The process of claim 28 in which said A.C. current has a frequency of from about 1 kilo Hz to about 5 mega Hz.

32. The process of claim 31 in which said frequency is from about 10 to about 500 kilo Hz.

33. In a fluidized bed reaction chamber for the heating of particles suspended in a surrounding gas flow, an improved apparatus for supplying heat to said chamber comprising:
(a) an A.C. power supply for supplying electrical power to said chamber;
(b) spaced-apart electrodes positioned so as to contact said fluidized bed zone within the reaction chamber, at least one of said electrodes having a dielectric coating thereon; and
(c) electrical connection leads connecting said A.C. power supply to said electrodes, whereby the activation of the power supply applies an alternating voltage potential between the spaced-apart electrodes positioned within the fluidized bed, causing the fluidized particles in the bed to be heated, the resulting heat passing from the individual particles to the surrounding gas and through the walls of the reaction zone or with the gas flow from said zone, the individual particles thus constituting the hottest portion of the heated fluidized bed reaction chamber.

34. The apparatus of claim 33 in which one said electrode is positioned in the interior of the fluidized bed and including a dielectric coating on the inside portion of the wall of the reaction chamber, said dielectric coated wall serving as a separate electrode, one of said connection leads thus being connected to said dielectric coated reaction chamber wall.

35. The apparatus of claim 34 in which said dielectric coating comprises high purity quartz.

36. The apparatus of claim 33 in which two electrodes are positioned within said fluidized bed zone of the reaction chamber.

37. The apparatus of claim 33 in which said electrodes comprise a grid of individual electrodes positioned within said reaction zone.

38. The apparatus of claim 34 in which said electrode positioned in the interior of said fluidized bed comprises a dielectric coated electrode.

39. The apparatus of claim 34 in which said reaction chamber coprises a cylindrical reaction chamber and said electrode positioned in the interior of the fluidized bed is centrally located within the reaction chamber.

40. The apparatus of claim 38 in which said dielectric coating comprises high purity quartz.

41. The apparatus of claim 38 in which said dielectric coating has a thickness of from about 0.05 to about 10 mils.

42. The apparatus of claim 41 in which said dielectric coating thickness is from about 0.1 to about 1.0 mils.

43. The apparatus of claim 41 in whcih said dielectric coating comprises high purity quartz.

44. The apparatus of claim 41 in which said dielectric coating comprises aluminum oxide.

* * * * *